(12) United States Patent
Snider

(10) Patent No.: US 9,409,534 B2
(45) Date of Patent: Aug. 9, 2016

(54) USER CONFIGURABLE VEHICLE STEERING COLUMN STALKS

(71) Applicant: Continental Automotive Systems, Inc., Auburn Hills, MI (US)

(72) Inventor: James R Snider, Kildeer, IL (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 477 days.

(21) Appl. No.: 13/906,992

(22) Filed: May 31, 2013

(65) Prior Publication Data

US 2014/0354045 A1    Dec. 4, 2014

(51) Int. Cl.
| B60R 16/00 | (2006.01) |
| B60R 16/03 | (2006.01) |
| B60K 35/00 | (2006.01) |
| B60K 37/02 | (2006.01) |
| G06F 3/0354 | (2013.01) |
| B60Q 1/14 | (2006.01) |

(52) U.S. Cl.
CPC ............ B60R 16/03 (2013.01); B60K 35/00 (2013.01); B60K 37/02 (2013.01); B60Q 1/1469 (2013.01); B60R 16/005 (2013.01); G06F 3/03547 (2013.01)

(58) Field of Classification Search
None
See application file for complete search history.

(56) References Cited

U.S. PATENT DOCUMENTS

2003/0023353 A1*  1/2003  Badarneh ...................... 701/1
2010/0268426 A1  10/2010  Pathak et al.

FOREIGN PATENT DOCUMENTS

| DE | 3913266 A1 | 10/1990 |
| DE | 10346112 A1 | 4/2005 |
| DE | 102010022620 A1 | 12/2011 |
| EP | 1331134 A2 | 7/2003 |
| EP | 1762421 A1 | 3/2007 |
| FR | 2772511 A1 | 6/1999 |
| WO | 87/06893 A1 | 11/1987 |
| WO | 97/13657 A1 | 4/1997 |
| WO | 01/60560 A1 | 8/2001 |

(Continued)

OTHER PUBLICATIONS

International Search Report and Written Opinion dated Oct. 9, 2014, from corresponding International Patent Application No. PCT/US2014/037340.

(Continued)

*Primary Examiner* — Jared Fureman
*Assistant Examiner* — Aqeel Bukhari

(57) ABSTRACT

A user-configurable steering column is made from steering column-mounted switches, each of which is coupled to a computer, which is also coupled to various different driver circuits, each of which is configured to control the operation of a corresponding vehicle accessory device, such as head lamps, a wiper motor or the vehicle's cruise control. A tactile-sensitive display device located in either a head unit, smart-phone inside the vehicle, or in a dedicated, dash board-mounted device, provides a menu of assignable switches and user-controllable devices, or it displays icons representing the switches and accessories. A driver assigns a switch to a particular accessory by selecting icons. The computer thereafter reads the switches' states and sends corresponding control signals to the drivers for the various devices that were mapped to the switches. Multiple different programmed configurations can be stored in a memory device and selected by a user using the tactile-sensitive display device.

19 Claims, 4 Drawing Sheets

(56) References Cited

FOREIGN PATENT DOCUMENTS

| WO | 2004/069593 A1 | 8/2004 |
|---|---|---|
| WO | 2007/045774 A1 | 4/2007 |
| WO | 2007/081782 A3 | 7/2007 |
| WO | 2010/109097 A1 | 9/2010 |
| WO | 2011/082921 A1 | 7/2011 |

OTHER PUBLICATIONS

Search Report dated Jun. 6, 2014, from corresponding GB Patent Application No. GB1316678.0.

* cited by examiner

USER CONFIGURABLE VEHICLE STEERING COLUMN STALKS

BACKGROUND

Different motor vehicles use different steering column-mounted switches to control different vehicle accessories. While most manufactures use the left-hand steering column stalk to control the turn signal indicators, there is no consistency between vehicle manufacturers as to how the steering column stalks are configured to control other vehicle accessories. One manufacturer might use the left-hand steering column stalk to control the head lamps while a second manufacturer uses the right-hand steering column stalk to control head lamps. Stated another way, before driving a car, a driver must learn how a manufacturer has configured a vehicle's controls. If a driver operates different vehicles with different steering column stalk configurations, the driver must get re-acclimated to the vehicles' differently-configured controls every time the driver drives a different vehicle.

BRIEF SUMMARY

In accordance with embodiments of the invention, a user-configurable steering column is made from steering column-mounted switches, each of which is coupled to a computer, which is also coupled to various different driver circuits, each of which is configured to control the operation of a corresponding vehicle accessory device, such as head lamps, a wiper motor or the vehicle's cruise control. A tactile-sensitive display device located in either a head unit, smartphone inside the vehicle, or in a dedicated, dash board-mounted device, provides a menu of assignable switches and user-controllable devices, or it displays icons representing the switches and accessories. A driver assigns a switch to a particular accessory by selecting icons. The computer thereafter reads the switches' states and sends corresponding control signals to the drivers for the various devices that were mapped to the switches. Multiple different programmed configurations can be stored in a memory device and selected by a user using the tactile-sensitive display device.

DETAILED DESCRIPTION

Figure 1:
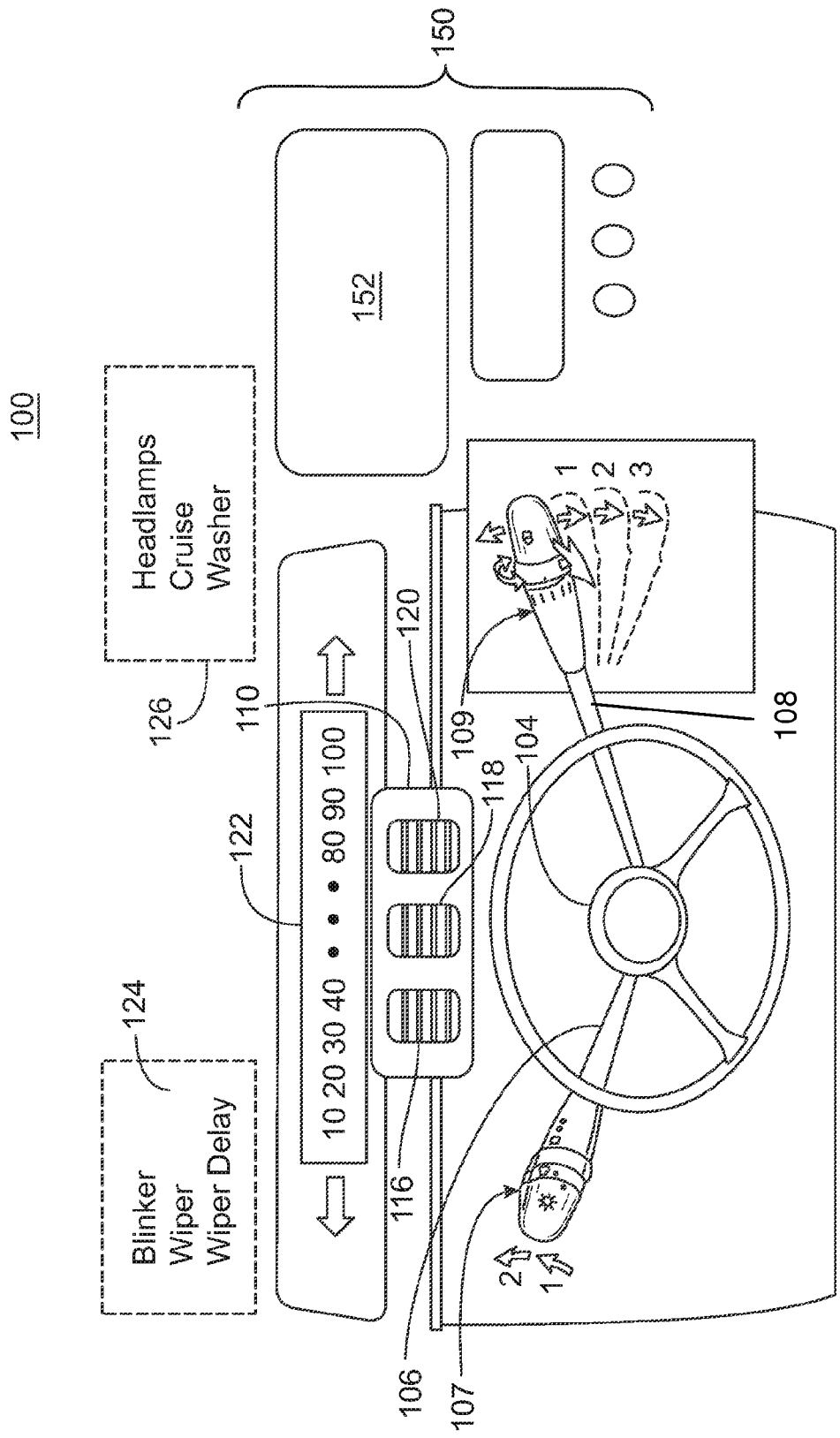
FIG. 1 is a block diagram of the dash board of a vehicle having user-configurable vehicle steering column stalks.

FIG. 1 is a schematic representation of a vehicle dash board 100. A conventional steering wheel is mounted on a conventional steering column 104.

Two slender and elongated rods or stems 106, 108, which are referred to herein as stalks 106, 108, extend outwardly from the steering column 104. The stalks 106, 108 are connected to electrical switches located inside the steering column 104, which can be actuated by a user moving a stalk upwardly and downwardly. Other switches in the steering column 104 are actuated by pulling the stalks 106, 108 toward the driver or pushing the stalks 106, 108 away from the driver.

The stalks 106, 108 are also provided with one or more user-rotatable electrical switches 107, 109 at their ends.

Unlike switches used in prior art steering columns and steering column stalks, the switches located in the steering column 104 and the switches located in the stalks 106, 108 are user-assignable. In other words, a driver can assign or specify the function of various switches located in or attached to a steering column stalk 106, 108 according to the driver's preferences. By way of example, either the left stalk 106 or the right stalk 108 can be selected by a driver to control one or both of the vehicle's left and right turn signals. Either the left stalk 106 or the right stalk 108 can be selected by a driver to control headlamps, wipers, cruise control, and other accessories.

In an embodiment, a driver "programs" the various switches connected to, or mounted within, a stalk 106, 108 to operate various different vehicle accessories using a touch-sensitive input/display panel 110. In FIG. 1, the touch-sensitive display panel 110 is shown as being located in the dash board, above the steering wheel, and below the speedometer 122, where the display 110 is within the driver's line of sight.

The display panel 110 is coupled to a computer, not visible in FIG. 1, which controls the panel 110 in order to display images and icons on the screen 110 and to receive signals from the panel caused by a user's tactile input to the panel 110. The computer also receives signals from the panel 110, which identify a particular area or icon that was selected by a driver during programming.

Icons or symbols 116, 118, and 120 representing user-programmable switches and user-controllable vehicle accessories, such as the headlamps, turn indicators, cruise control, wipers, and windshield washer are displayed on the panel 110. The icons 116 representing programmable switches coupled to the left stalk 106 may be displayed on the left side of the panel 110. Icons 120 representing programmable switches coupled to the right stalk 108 may be displayed on the right side of the panel 110. Icons representing various vehicle accessories 118 that can be selectively controlled by one or more switches 107, 109 mounted to, or within, one, or both, of the stalks 106, 108 may be displayed in the center 118 of the panel 110. The accessory icons 118, which are displayed between the two banks or sets of switch icons 116, 118, represent various electrically-operated and driver-controllable devices located throughout a motor vehicle.

As set forth below, switches 107, 109 in the stalks 106 and 108, or which are inside the steering column 104 but nevertheless connected to the stalks 106, 108, can be assigned and reassigned according to a driver's individual preferences. After a stalk-controlled switch is assigned to a vehicle accessory, the accessory to which the stalk-controlled switch is assigned may be displayed on the windshield, immediately above the stalk. Such displays may be accomplished using a well-known heads up display device, not visible in FIG. 1.

By way of example, a left-hand heads up display area 124 immediately "above" the left-hand stalk 106 displays icons, or text, that identify vehicle accessories that have been assigned to, and which are controlled by, switches 107 actuated by the left-hand stalk 106. A second heads up display area 126 located "above" the right-hand stalk 108 displays, or lists, vehicle accessories assigned to, and which are controlled by, switches 109 actuated by the right-hand side stalk 108. Both heads up displays 124, 126 may be located immediately above a speedometer 128 within, or near, a driver's line of sight.

As used herein, a head unit is considered to be a component of a vehicle's information/entertainment system, which provides a unified hardware interface for various components of electronic media systems, e.g., radio, disc player, and navigation systems. Head units can comprise a touch-sensitive display panel. In an embodiment, the information about how stalks 106, 108 are programmed, and which is provided to the heads up display areas 124, 126 can be provided instead to the vehicle's head unit 150. In FIG. 1, the head unit 150 comprises a touch-sensitive display screen 152. In such an embodiment, the stalks 106, 108 may be programmed through the display screen 152 in a manner similar to the way they are programmed using the display panel 110.

As used herein, a smartphone is considered to be a mobile phone built on a mobile operating system and having advanced computing capability. Smartphones combine functionality of a mobile phone with the functionality of portable media players, digital cameras, and GPS navigation units. Some smartphones also include high-resolution touch-screens, Internet connectivity, and web browsers by which web pages can be accessed. High-speed data access is usually provided by Wi-Fi and mobile broadband. A special-purpose program that runs on a processor in the smart phone, and which is commonly known as an application program or "app" is able to configure, and re-configure, a smartphone in order to enable a smartphone to perform many different types of tasks.

In another embodiment, a Bluetooth transceiver in the vehicle communicates wirelessly with a Bluetooth transceiver in a Bluetooth-equipped smartphone. An application program in the smartphone establishes communications with the computer controlling the steering wheel stalks 106, 108 and can either upload or download data indicative of the smart phone user's personal preferences of how the stalks 106, 108 should be programmed. In so doing, the smartphone is able to download to an appropriately configured vehicle, a user's personal preferences as to how the programmable stalks 106, 108 are to be configured.

Figure 2:
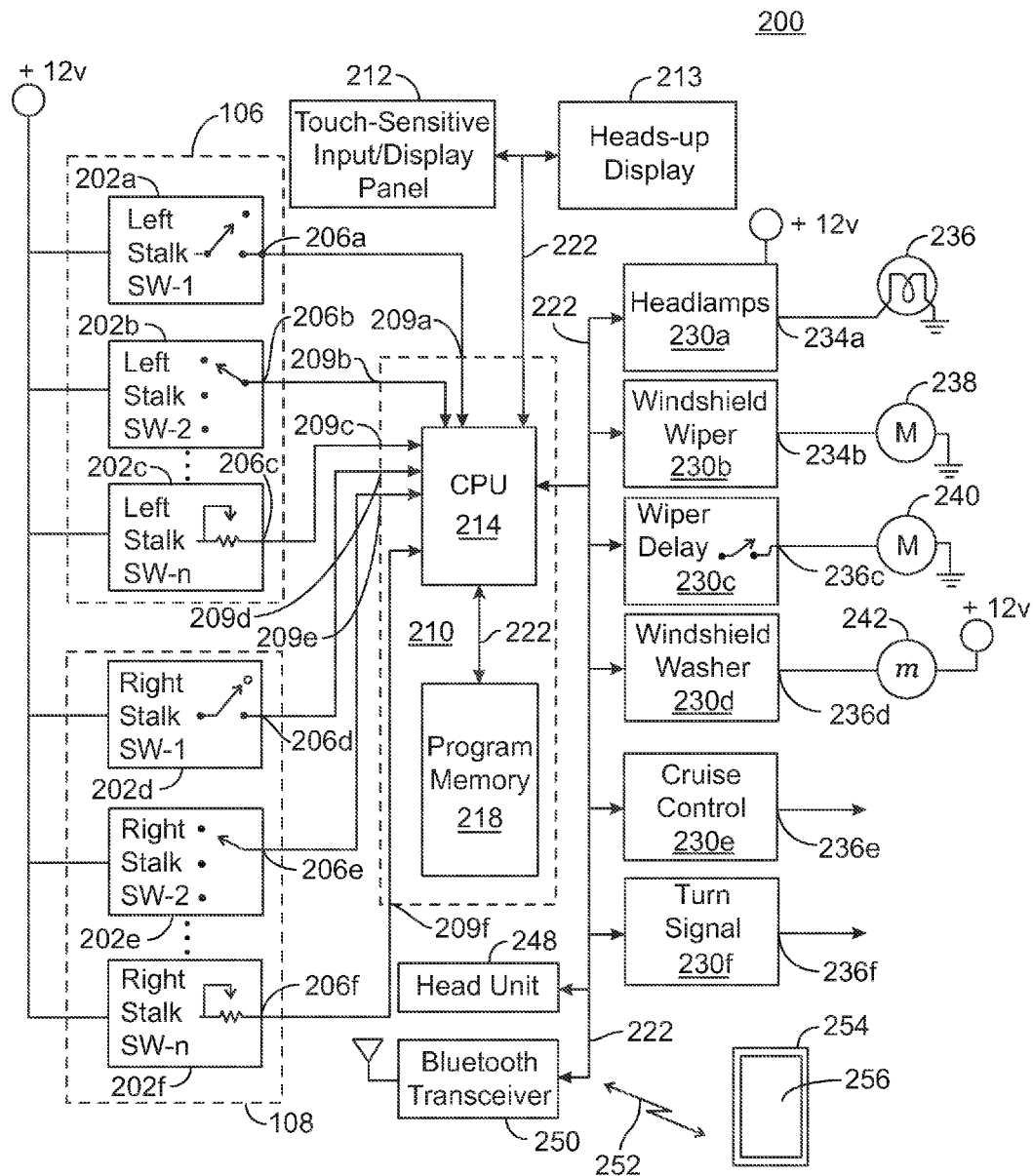
FIG. 2 is a block diagram of the circuitry and devices to provide a user-configurable steering column.

FIG. 2 is a block diagram of the circuitry and devices 200 that provide a user-configurable steering column, which has user-operable switches that can be assigned and reassigned according to user/driver preferences. One or more switches 202a-202b mounted on, or operable by, the left stalk 106 and having outputs 206a-206b are connected to receive an input voltage from the vehicle's power supply, or battery, and to provide electrical signals to corresponding inputs 209a-209b to a computer 210 comprising a central processing unit, or CPU 214, and a non-transitory memory device 218, such as a conventional, prior art semi-conductor device configured to store program instructions and data for the CPU 214. Each stalk 106, 108 is also able to control at least one potentiometer 202c, 202f, and thereby provide a variable voltage at corresponding outputs 206c, 206f, which are coupled to corresponding inputs 209c, 209f of the CPU 214.

The electrical signals received by the CPU 214 at the various inputs 209a-209f are indicative of the corresponding switches' 202a-202f operation. When a particular switch or potentiometer 202a-202f is actuated, the corresponding signal that the switch/potentiometer sends to the CPU 214 is recognized by the CPU as coming from a particular switch/potentiometer by virtue of the input port 209a-209f on which the switch's signal was received. The type of signal output from a particular switch is translated by the CPU into a corresponding control signal sent to a controller 230a-230f for a particular accessory.

The device shown in FIG. 2 is controlled by instructions executed by the CPU 214, and which are stored in the non-transitory program memory device 218. The memory device 218 and CPU 214 are coupled to each other via a well-known address, data, and control bus 222. Instructions and data stored in the memory device 218 cause the computer 214 to display the aforementioned icons on a touch-sensitive input/display panel 212, which is also coupled to the CPU 214 via the same bus 222.

FIG. 2 shows a head unit 248 coupled to the bus 222 and therefore in communication with the CPU 214. In an alternate embodiment, stalk configurations of different drivers can be stored in the memory device 218. One or more icons, or labels, can then be displayed on either a touch sensitive display panel 212, a heads up display device 213, or a touch-sensitive display screen for the head unit 248 in order to inform a driver that programmable stalk configurations are stored and available for prompt recall and implementation. A driver can thus select a pre-stored stalk configuration by touching one of the touch-sensitive display devices where an icon, or label, is displayed. Signals generated by the display device responsive to a driver's selection of a particular area of a touch-sensitive display device cause the CPU 214 to retrieve a corresponding switch matrix configuration from the memory device 218 and program the stalks accordingly.

A Bluetooth transceiver 250, which is also coupled to the bus 222 and therefore in communication with the CPU 214, is able to communicate wirelessly 252 with a smartphone 254 having a user interface 256, which may be a touch-sensitive display screen. The wireless communications 252 enable the smartphone 245 to obtain and display on its user interface 256, pre-stored settings for the programmable stalks 106, 108. A smartphone user can thus read available configurations, select a configuration and instruct the CPU 214 to implement a selected configuration, all from the user interface 256 of a smartphone.

The touch-sensitive input/display panel 212 is touch-sensitive. When a user touches the panel 212, the location of the tactile input can be determined from signals output from the panel 212. When those signals from the panel 212 are received by the CPU 214, other instructions cause the CPU 214 to decode panel signals and determine there from, whether a user has "selected" a particular icon displayed on the panel 212. A user selects a particular icon by touching the panel 212 where the icon is displayed. Whether a selected icon is either a switch icon or an accessory icon is determined by signals sent from the display panel 212 to the CPU 214 via the bus 222. The CPU 214 can thus "read" or determine a user's selection of an icon representing a switch and an accessory and thereby determine the identity of an accessory to be controlled by a selected switch and vice versa.

Upon receipt of a vehicle's accessory icon selection and receipt of a switch's icon selection, program instructions stored in the memory device 218 cause the CPU 214 to associate the selected vehicle accessory to the selected switch. The selected accessory will thereafter be controlled by the selected switch/potentiometer, regardless of whether the switch/potentiometer is controlled by the left stalk 106 or the right stalk 108, at least until the accessory is re-assigned to a different switch/potentiometer controlled by either the left stalk 106 or the right stalk 108.

After an accessory is assigned to a switch/potentiometer, program instructions in the memory 218 cause the CPU 214 to send signals to the heads up display device 213, in order cause the heads up display device 213 to project the user's selection as a menu 124, 126. The menus 124, 126 are aligned with corresponding stalks 106, 108. Accessories assigned to a switch/potentiometer controlled by the left-hand stalk 106 are represented by icons or identified by text that appears in the left-hand menu 124. Similarly, accessories assigned to a switch/potentiometer controlled by the right-hand stalk 108 are represented by icons or identified by text that appears in the right-hand menu 126.

In the embodiment shown in FIG. 2, the computer 210 is coupled to several, individually-controllable power controllers 230*a*-230*f* via the bus 222. In one embodiment, the power controllers 230*a*-230*f* comprise conventional, high-power junction field effect transistors (JFETs). They are configured as appropriate in order to source or sink current in order to control various electrically-operated accessory devices such as head lamps 236, windshield wiper motors 238, 240 and windshield washer motors 242, in response to signals output to the controllers 230*a*-230*f* from the CPU 214. A signal output onto the bus 222 by the computer 210 and addressed to a power controller 230 can thus cause an accessory device to operate, responsive to actuation of a switch/potentiometer that was assigned to the accessory during a switch/potentiometer programming operation depicted in FIG. 4.

When a user selects a particular switch/potentiometer 202*a*-202*f* to control a particular accessory, such as selecting an on/off switch in the right-hand stalk 108 switch to control the vehicle's headlamps 236, the computer 214 will selectively send a signal to the power controller 230*a* for the headlamps 236 responsive to actuation of the on/off switch that was selectively assigned to the head lamps by the user as described above. Subsequent actuation of the switch assigned to the head lamps will thereafter control the head lamps, until a different switch is assigned to the head lamps. Other switches can be assigned to other accessory devices in a similar way. Program instructions stored in the memory device 218 and the control exercised by the CPU 214 on the controllers 230*a*-230*f* enable various switches/potentiometers attached to, mounted in, or controlled by stalks 106, 108 to be assigned and re-assigned to different vehicle accessories thereby enabling a user to customize the operation of the steering-column mounted stalks as the user chooses.

Figure 3:
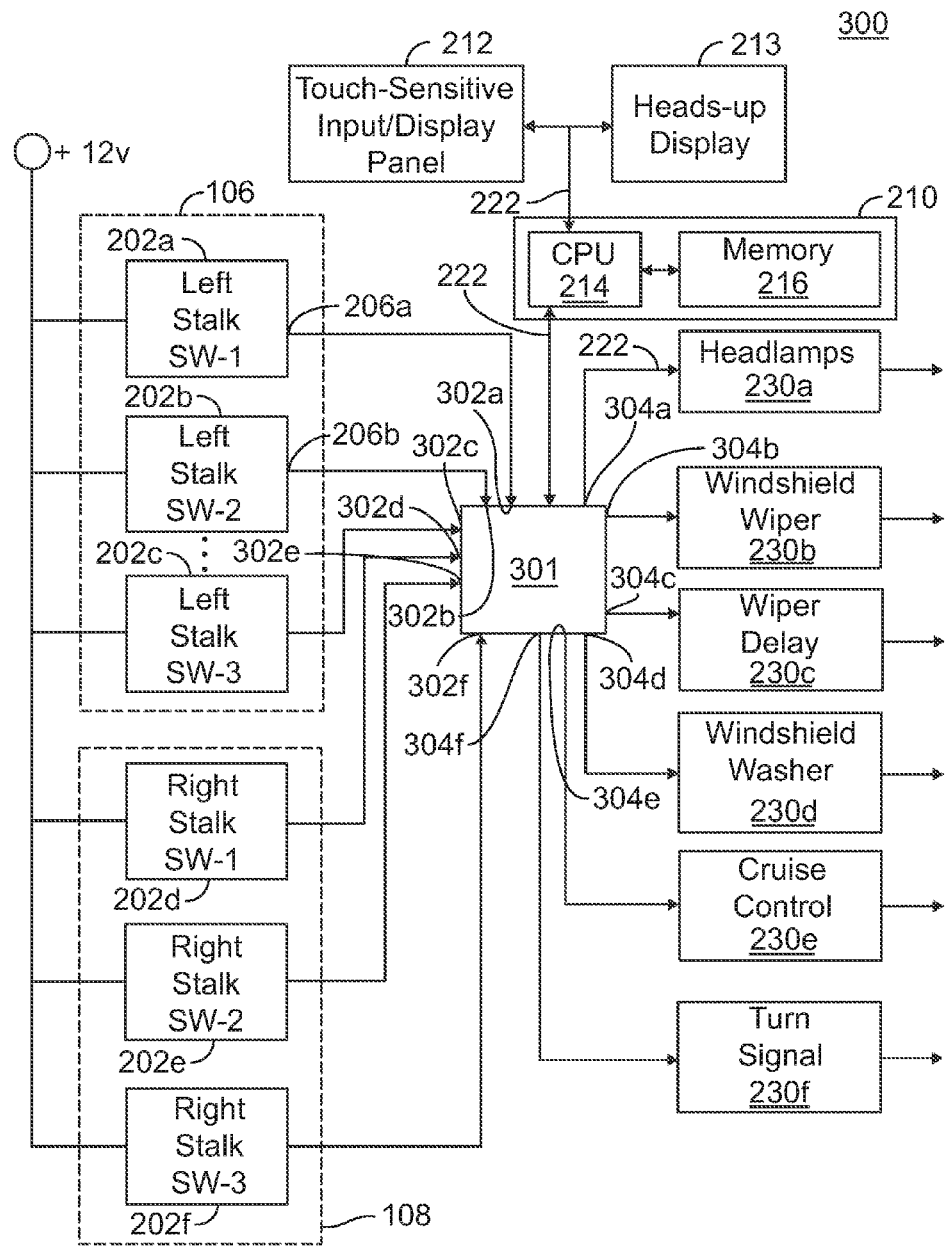
FIG. 3 is an alternate embodiment of a user-configurable steering column.

FIG. 3 is an alternate embodiment of a user-configurable steering column 300 in which a conventional prior art switch matrix 301, having multiple separate inputs 302*a*-302*f* and multiple separate outputs 304*a*-304*f*, is coupled to a computer 210 via the aforementioned bus 222. The matrix 301 thus routes signals from the switches 202*a*-202*f* to different power controllers 230*a*-230*f* for corresponding accessories, responsive to signals that the matrix 301 receives from the CPU 214.

The switch matrix 301 is configured by the computer 214 responsive to the same switch and accessory selections made by a user on a touch-sensitive input display panel 212 as described above. The configuration of switches, potentiometers, and accessories selected by a user is thereafter displayed using a heads up display device 213, also as described above. Except for the switch matrix 301, the operation of the device shown in FIG. 3 and its configuration are the same as that shown in FIG. 2, including the interoperability with head unit 248 and a smartphone 254 via a Bluetooth transceiver 250, as described above with respect to FIG. 2.

Figure 4:
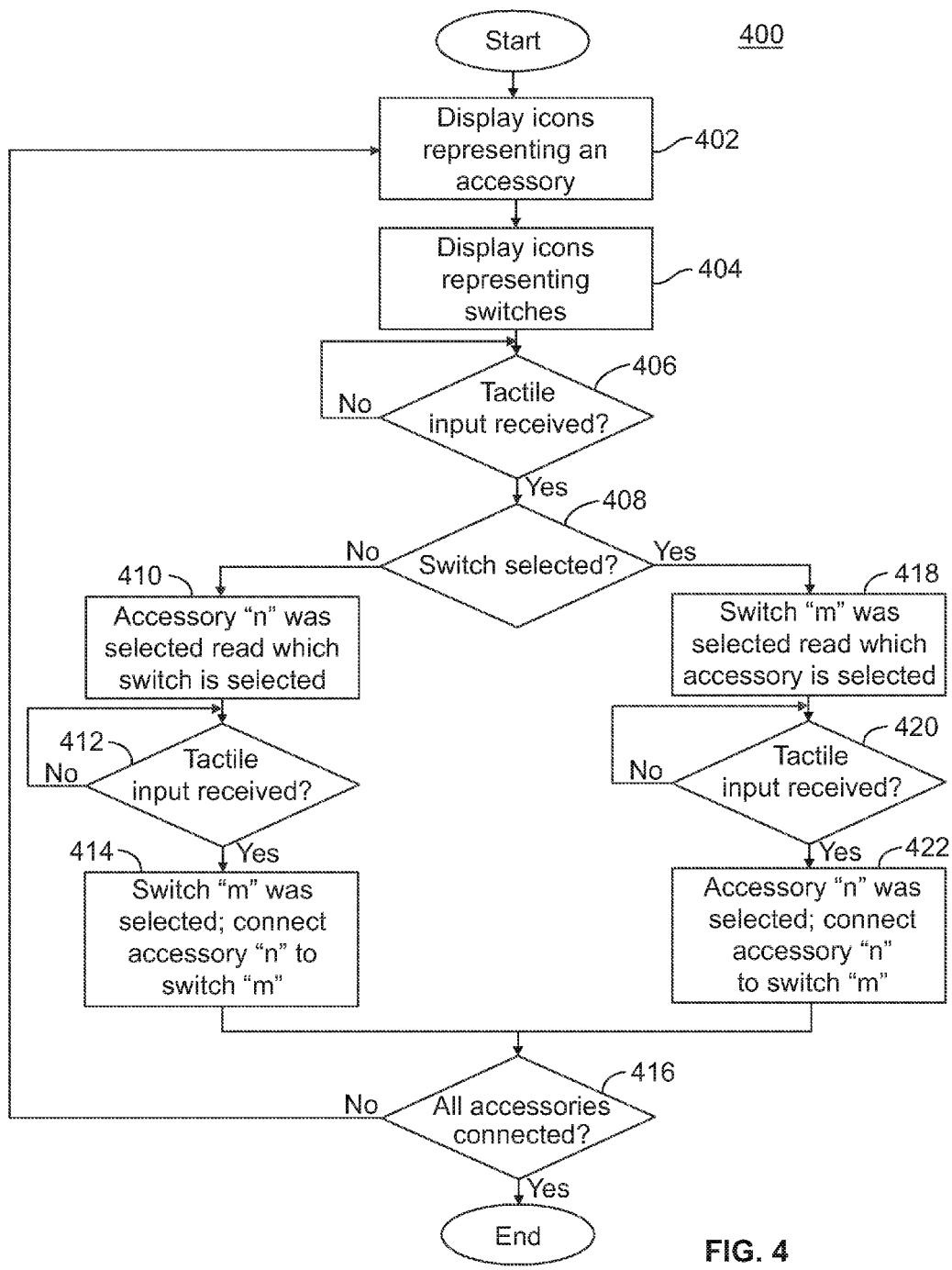
FIG. 4 shows steps of a method to selectively control electrical operable accessories by different switches.

FIG. 4 shows steps of a method 400 to selectively control electrical operable accessories by different switches and/or potentiometers. At step 402, various icons representing switch/potentiometer-controllable accessories are displayed on a display device, such as the touch-sensitive display device described above. At step 404, icons representing various user-operable switches and/or potentiometers are displayed.

Those skilled in the art will recognize that steps 402 and 404 can be interchanged or even combined. After the icons are displayed however at step 406, the method waits until a tactile input is received. Such an input can be the selection of either an accessory or a switch/potentiometer with the determination being made at step 408 whether a switch/potentiometer or accessory was selected.

At step 410, an accessory is determined to have been selected. Therefore, at 412 and 414, the method is to wait until a particular switch/potentiometer is selected to control the just-selected accessory to be controlled.

Referring again to step 408, if a switch/potentiometer is selected by a user rather than an accessory, the selected switch/potentiometer is determined at step 418. The method 400 is to thereafter wait in steps 420 and 422 until a particular accessory to be controlled by the just-selected switch/potentiometer is chosen.

At step 416 a decision is made whether all of the vehicle's controllable accessories have been connected to at least one switch and/or potentiometer. If not, the method is to return to step 402 where the selection of the next switch or potentiometer and/or accessory is made and the procedure repeated. Once all of the switchable accessories have been assigned to at least one switch or potentiometer, the method ends at step 418.

The apparatus and method described above may display multiple icons on a display device 110 at the same time. Each icon 116, 118, 120 is representative of a user-controllable accessory such as the headlights, windshield wiper, windshield wiper delay, windshield washer functionality, cruise control, and turn signals, or other controllable device operable using one or both of the stalks 106, 108. The various mechanical switches and controls mounted to, attached to, or otherwise controlled by the steering column stalks 106, 108 are also represented by icons.

In an embodiment the icons representing accessories and the icons representing switches and other controls are displayed together on a touch-sensitive display device that may be mounted or attached to the dashboard. The icons may be displayed together to facilitate their orderly selection. By providing such user-configurable vehicle steering column stalks, it is possible for a driver to assign switch functionality in one car that matches the switch functionality in another car reducing driver distraction while driving a vehicle that he or she does not normally drive and is therefore not familiar with.

The foregoing description is for purposes of illustration only. The true scope of the invention is set forth in the following claims. For purposes of claim construction, the term switch should be construed to include an on/off switch regardless of the mechanism by which it is opened and closed, a momentary switch regardless of the mechanism by which it is opened and closed, a potentiometer, or variable resistor, regardless of the mechanism by which a variable resistance is provided, a capacitance sensor as well as any other user-actuated device that outputs an electrically-measurable signal responsive to its operation by a user.

The invention claimed is:

1. A user-configurable steering column for a vehicle comprising:
    first and second steering column-mounted switches, each switch being configured to output an electrical signal responsive to a user's mechanical operation thereof;
    a radio frequency transceiver, configured to wirelessly communicate with a smartphone and configured to receive steering column-mounted switch configuration information therefrom;
    a computer coupled to the first and second steering column-mounted switches and to the radio frequency transceiver;
    a user-operable input device coupled to the computer;
    an output display device coupled to the computer;

a first power controller coupled to the computer and coupled to a corresponding first accessory device, the first power controller configured to selectively operate the first accessory device, responsive to a control signal received by the first power controller; and a second power controller coupled to the computer and coupled to a corresponding second accessory device, the second power controller configured to selectively operate the second accessory device, responsive to a control signal received by the second power controller;

wherein the computer is configured to selectively associate an electrical switch to different ones of the first and second power controllers responsive to an input signal received by the computer from either the user-operable input device or from the radio frequency transceiver.

2. The user-configurable steering column of claim 1, wherein the output display device is configured to display icons representing switches, which can be associated by the computer with different power controllers, and configured to display icons representing accessory devices, which are controlled by corresponding power controllers, wherein the input device, output display device and computer are configured to enable a user of the user-configurable steering column to select an icon representing a switch, select an icon representing an accessory and thereafter selectively control operation of the selected accessory by operating the selected switch.

3. The user-configurable steering column of claim 1, wherein, after a first electrical switch is associated with a first power controller and corresponding accessory, the computer is additionally configured to selectively control the first power controller and the corresponding first accessory device responsive to a signal received by the computer from the first electrical switch.

4. The user-configurable steering column of claim 3, wherein, after the first electrical switch is associated with the first power controller, the computer is additionally configured to selectively control the second power controller and the second accessory device responsive to a signal received by the computer from the second electrical switch.

5. The user-configurable steering column of claim 1, wherein the input device is a touch-sensitive panel, configured to receive a tactile input and generate an output signal responsive to the tactile input.

6. The user-configurable steering column of claim 5, wherein the input device is a dashboard-mounted, touch-sensitive display panel.

7. The user-configurable steering column of claim 1, wherein the input device and the output device comprise a touch-sensitive display panel, which is configured to display images, and receive tactile input and generate an output signal responsive to, and representative of, a received tactile input.

8. The user-configurable steering column of claim 7, wherein the input device and the output device comprise a touch-sensitive display panel that comprises a vehicle head unit.

9. The user-configurable steering column of claim 7, wherein the input device and the output device comprise a touch-sensitive display panel that comprises a mobile smartphone, inside the vehicle.

10. The user-configurable steering column of claim 1, wherein the display device is a heads-up display device, configured to cause icons to be displayed on a vehicle's windshield in a driver's line of sight.

11. The user-configurable steering column of claim 10, wherein the computer and display device are configured to display a first icon representative of a first, user-controllable accessory, a second icon, representative of a second, user-controllable accessory, a third icon representative of a first switch that was associated with and which controls the first, user-controllable accessory and a fourth icon, representative of a second switch a user-controlled accessory represented by the first displayed icon.

12. The user-configurable steering column of claim 10, wherein the first displayed icon and the second displayed icon are displayed together.

13. A user-configurable steering column comprising:
    a switch matrix having a plurality of inputs and a plurality of outputs, the switch matrix being configured to selectively connect each of the plurality of inputs to a different one of the plurality of outputs, responsive to a control signal input to the switch matrix;
    a plurality of steering column-mounted switches, each switch coupled to a corresponding input of the switch matrix, each switch configured to output a signal responsive to a user's operation of the switch;
    a user-operable input device;
    a radio frequency transceiver, configured to wirelessly communicate with a smartphone and configured to receive steering column-mounted switch configuration information therefrom;
    a computer coupled to the user-operable input device, the switch matrix and to the radio frequency transceiver; and
    a plurality of controllers, each coupled to a corresponding accessory device and configured to selectively provide electric energy to the corresponding accessory device responsive to a control signal received by a power controller from the switch matrix;
    wherein the computer is configured to selectively associate a steering column-mounted switch to different power controllers responsive to an input signal received by the computer from either the user-operable input device or from the radio frequency transceiver.

14. The user-configurable steering column of claim 13, further comprising an output device coupled to the computer, the output device being configured to display icons representing the switches and icons representing accessory devices.

15. A method of selectively controlling electrically operable accessories by different switches, the method comprising the steps of:
    displaying on a display device, icons representing vehicle accessory devices;
    displaying on a display device, icons representing vehicle switches that can control vehicle accessory devices;
    wirelessly receiving from a smartphone, a selection of a first switch to associate with a first accessory;
    selecting an accessory to be associated with the first selected switch by wirelessly receiving a second input from the smartphone; and
    coupling the selected first switch to the selected accessory, whereby the selected accessory is controlled by the selected switch.

16. The method of claim 15, wherein the step of coupling the selected first switch to the selected accessory comprises the steps of:
    receiving a first electrical signal from the selected first switch at a computer;
    outputting a second electrical signal from the computer and coupling the second electrical signal to the selected accessory.

17. The method of claim 15, wherein the steps of displaying icons representing accessory device and the step of displaying icons representing switches comprises displaying both icons on the same display device on the smartphone.

18. The method of claim 15, wherein the step of selecting a first switch comprises providing a first tactile input to a tactile-sensitive display device on the smartphone.

19. The method of claim 15, wherein the step of selecting a first an accessory comprises the providing a second tactile input to the tactile-sensitive display device on the smartphone.

* * * * *